United States Patent [19]

Hararat-Tehrani et al.

[11] Patent Number: 4,899,960
[45] Date of Patent: Feb. 13, 1990

[54] DECOMPRESSION PANEL FOR AIRCRAFT PARTITION

[75] Inventors: Mohamad Hararat-Tehrani, Bremen; Frank Schwarz, Bremerhaven; Michael Taddiken, Bassum, all of Fed. Rep. of Germany

[73] Assignee: MBB GmbH, Bremen, Fed. Rep. of Germany

[21] Appl. No.: 191,412

[22] Filed: May 9, 1988

[30] Foreign Application Priority Data

May 8, 1987 [DE] Fed. Rep. of Germany ....... 3715328

[51] Int. Cl.⁴ ............................................... B64C 1/14
[52] U.S. Cl. .............................. 244/118.5; 244/129.4; 292/19; 292/259 R; 52/1; 52/98; 137/70; 137/68.1
[58] Field of Search ............... 244/129.5, 118.1, 118.5, 244/129.1, 129.4, 1 R, 121; 220/89 A, 203; 292/259, 19; 52/98, 1; 137/68 R, 70

[56] References Cited

U.S. PATENT DOCUMENTS

| | | | |
|---|---|---|---|
| 2,209,399 | 7/1940 | Hall | 220/89 A |
| 2,355,485 | 8/1944 | Tinnerman | 292/259 |
| 3,571,977 | 3/1971 | Abeel | 244/129.5 |
| 3,864,881 | 2/1975 | Wolf | 52/1 |
| 3,972,442 | 8/1976 | Malcolm | 220/89 A |
| 4,027,436 | 6/1977 | Daly | 52/98 |
| 4,553,559 | 11/1985 | Short, III | 220/89 A |
| 4,656,793 | 4/1987 | Fons | 52/1 |
| 4,703,908 | 11/1987 | Correge et al. | 98/1.5 |

FOREIGN PATENT DOCUMENTS 558140 12/1943 United Kingdom ............. 244/129.4

Primary Examiner—Galen Barefoot
Attorney, Agent, or Firm—Ralf H. Siegemund

[57] ABSTRACT

Decompression in a partition separating passenger from cargo compartments in aircraft, there being a particular opening in the partition, receiving a decompression blowout/in panel; a frame circumscribes the decompression panel and has an outer contour inserted into the panel opening, one side of the frame is provided with a flange, being sealed as against the decompression panel as well as against the partitions adjacent the opening, the other side of the frame is provided with a plurality of T-shaped holding springs engaging the partition as well as the decompression panel; each of the springs is provided with predetermined fracture points.

5 Claims, 2 Drawing Sheets

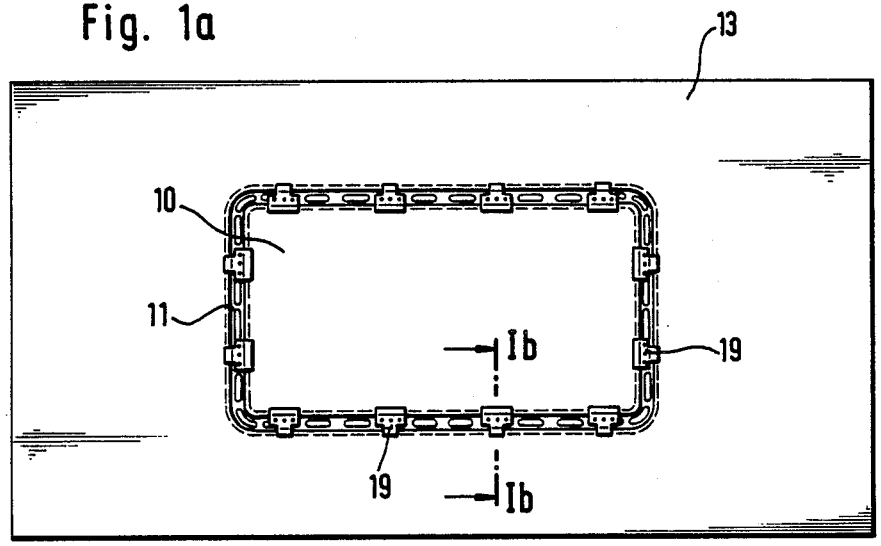
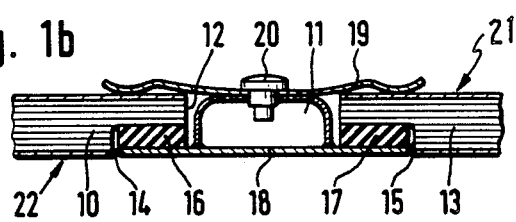
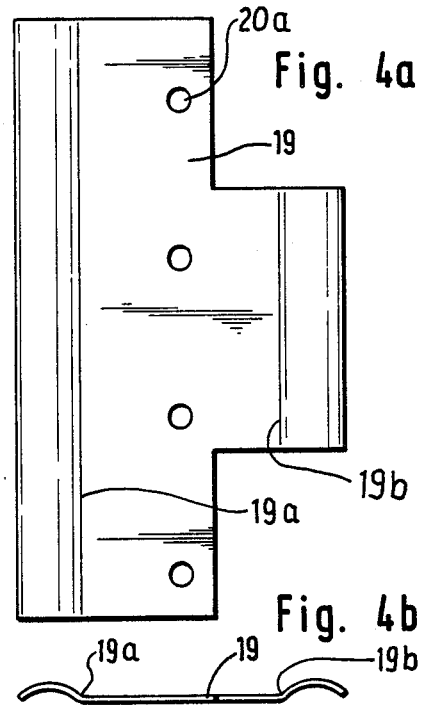
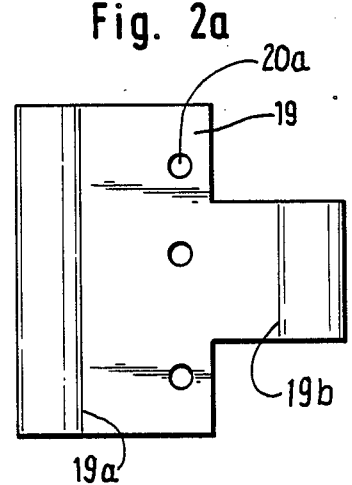
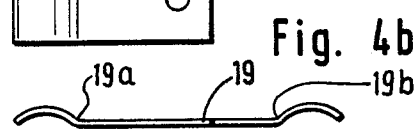
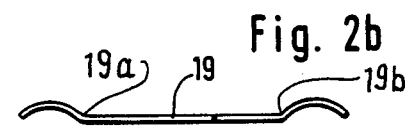

DECOMPRESSION PANEL FOR AIRCRAFT PARTITION

BACKGROUND OF THE INVENTION

The present invention relates to a decompression panel for use in walls or intermediate bottoms in aircraft, all being hereinafter referred to as partitions. An aircraft is often subdivided, for example, into a passenger compartment and a freight or cargo compartment(s). More particularly then, the invention relates to a decompression panel of the kind referred to above wherein a definite sealing is provided for normal situations, panels being insertable in a relatively large decompression opening. The panel is presumed to be of a sandwich construction, being held in that opening by, say, uniformly distributed holding and clamping structures or the like.

A sudden decompression of an explosive nature may occur in aircraft, particularly when flying at an altitude in which the pressure is significantly reduced as compared with ordinary surface pressure. Aircraft have to be designed, as far as the fuselage is concerned, to operate in a pressurized condition, in that the air pressure inside is similar to the pressure near the earth's surface. Hence, in higher altitudes there is a very high pressure differential between the interior of the fuselage and the external environment.

Known commercial aircraft are usually provided with a passenger compartment as well as with a cargo compartment separated from each other through bottom sealing structure such as appropriate partitions, walls, etc. It may be of advantage to subdivide and to seal the cargo space through additional partitions. In the case an explosive decompression occurs in one, for example, the cargo compartment, it is desirable to prevent the immediate propagation of that explosive decompression into the passenger compartment. Hence, one will provide for a particular pressure equalization system in order to avoid the destruction of, e.g. the floor ceiling partition that separates the two compartments. Here one has to consider also that flight control lines may run inside various walls, from the front to the rear of the craft and they, of course, must be protected too.

The known pressure compensating systems uses relatively large decompression openings in the lining for the cargo space as well as in intermediate bottom ceiling partitions. These openings are closed through decompression panel in a sandwich construction. The panel is to be kicked out in certain situations. The decompression panel, therefore, is inserted in the opening and is held in that opening through a bar on one side, and appropriate locks hold the bar plus panel in the opening. Certain sealing strips are provided to fasten and seal the panel right in the opening. The closure elements, locks, etc., are spring-loaded, pointed pins which are accommodated in casings being specially provided for at the decompression panel. In the case a particular, predetermined pressure differential obtains, either the closures or the bar attached to and being part of the decompression panel are subject to such a force so that the panel is forced out of the opening.

This particular approach, and here particularly the construction of and affixation the decompression panel used, is not satisfactory, because on occurrence of a decompression the triggering of panel points out results from the bending of rods and not through closure elements. This approach was found not to establish a sufficiently narrow range in the pressure differential that is necessary for a due response. Moreover, the rods may deform in the case of fire in the cargo department, so that the sealing of the decompression opening is interfered with. That, in turn, means that fresh air may enter the fire area and feed the fire inappropriately.

DESCRIPTION OF THE INVENTION

It is an object of the present invention to provide a new and improved decompression panel of the kind referred to above but having a simplified holding and clamping structure which is capable of responding to well-defined pressure differentials while the integrity of any sealing remains, even if there is a fire in the cargo department. Of course there is a time limit which, however, is to be as large as possible.

It is another object of the invention, to provide a new and improved panel and holding construction in partitions in aircraft that provides for bi-directional response to pressure differentials.

In accordance with the preferred embodiment of the present invention, it is suggested to provide a decompression panel with a frame wich, in turn, is provided on one side with a flange; that flange is provided with a sealing and engages the panel proper as well as wall the opening defining parts in the partition (wall or ceiling plates) in the aircraft; a plurality of holding springs is mounted to the other side of the frame, each of these springs has well-defined fracture point and reaches over and beyond the panel for engaging the partition and hold the panel frame in the opening.

The inventive decompression panel offers the advantage that it is capable of responding to pressure differential in both directions. This is made possible through the well-defined fracture points in the holding springs. Moreover, the sealing is constructed to make sure that the closure remains in fact sufficiently long closed in case of a fire, so that an airplane, even with a fire raging in the freight compartment, can still land safely for an extensive period of time.

DESCRIPTIONS OF DRAWINGS

While the specification concludes with claims particularly pointing out and distinctly claiming the subject matter which is regarded as the invention, it is believed that the invention, the objects and features of the invention, and further objects, features and advantages thereof will be better understood from the following description taken in connection with the accompanying drawings in which:

FIG. 1a is aside view of a first example of a preferred embodiment of the present invention, showing a wall partition and a decompression panel in accordance with the invention;

FIG. 1b is a section, as indicated by line 1b—1b in FIG. 1a, but being on an enlarged scale;

FIGS. 2a and 2b are respectively front and side views of a spring improved in accordance with the present invention;

FIGS. 4a and 4b are, respectively, front and side views of a modified holding spring.

Figure 3A:
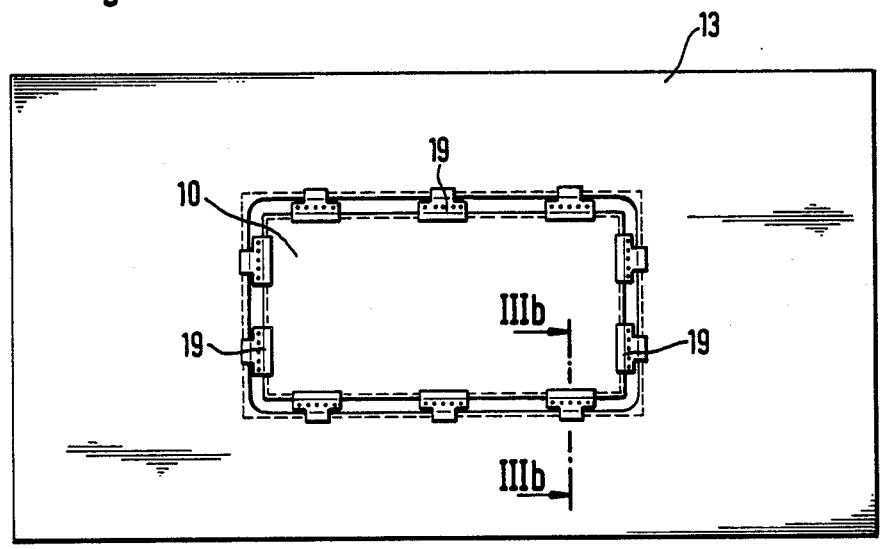
FIG. 3a is another example for a wall partition showing a decompression panel when inserted, but has a modified construction, still being an example of the preferred embodiment of the invention.

Proceeding now to the detailed description of the drawings, reference is made at first specifically to FIGS. 1a and 1b which show a wall partition 13 with a decompression opening 12. A decompression panel 10, in accordance with the present invention, is inserted into that opening 12. The panel 10 is particularly constructed as a sandwich plate and includes a frame 11 holding the sandwiched lamina. The frame 11 has an outer contour matching that of the decompression opening 12. The frame 11, moreover, is provided with a U-shaped cross-section (see FIG. 1b).

The legs of the U abut the decompression opening 12 as well as the decompression panel 10 itself. The decompression opening 12 as well as the panel 10 are respectively provided with grooves 14 and 15 delineating, so to speak, the opening and the panel rim, and being, respectively, provided for receiving sealing rings 16 and 17. These sealing rings 16 and 17 are held in position by a flat flange 18, which is fastened to the frame 11 and here particularly the front part of the U legs, e.g. by means of welding. A known connecting method such as resistance welding or the like provides a connection of the flange with the frame 11.

The flange 18 has a certain width which is matched to the grooves 14 and 15 of the wall 13 and the panel 10, respectively, and to the width of frame 11. The length of the legs of the U-shaped cross-section of frame 11 corresponds to the thickness of the wall 13, as well as of the decompression panel 10.

In order to hold the frame as well as the panel 10 as a whole within the decompression opening 12, a plurality of uniformly distributed flat holding springs 19 are provided. These holding springs are illustrated by way of example in FIGS. 2a and 2b. As can be seen from these figures, the springs are constructed as flat spring elements 19 in an overall T-shaped configuration of the elevation. The stem end, as well as the upper part of the cross bar, are of trough shape. The springs 19 have openings 20 for fastening to frame 11, so that their backs abut wall 13 and the decompression panel 10, for clamping. Specifically, the trough of the cross bar of the T abuts panel 10, and the trough of the stem abuts partition 13.

Following insertion of the frame 11 into the opening 12, and following the fastening of the decompression panel 10 to the frame 11, including placement of the seals 16 and 17, the holding springs 19 are then fastened to the frame 11 by means of blind rivets 20. These blind rivets should be of the kind which have a universal head for general usage with a self-locking rivet structure. This way of fastening is simple, economical, and very reliable.

The springs 19 are provided with weak lines or fracture points 19a, 19b, particularly adjacent at the clamping troughs. These fracture points will cause the springs to break in case an explosive decompression occurs on one side of the wall or the other. Since decompression is effective bi-directionally (see arrows 21 and 22), the springs have to be provided each with two rupture points or lines (19a and 19b).

Figure 5A:
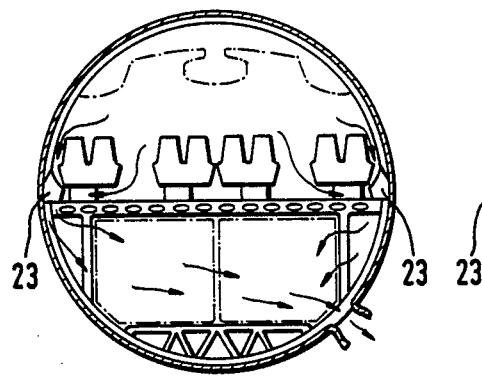
FIGS. 5a and 5b illustrate two different cases and situations of decompression in an aircraft.

In the case of a decompression in the passenger compartment from the cargo department, a situation obtains as shown in FIG. 5a and here one talks about a blow-in decompression. In this case, the decompression acts in the direction of arrow 21, as shown on FIG. 1B. Consequently, the fracture points in the smaller bar area of the T-shaped holding springs 19 fracture, and the panel 10 with the frame 11 are forced out of the opening 12 (in the direction of arrow 21). Hence the width of the narrow part of holding springs 19 establishes a well-defined differential pressure area for response to the decompression situation by the panel for a blow in situation.

Figure 5B:
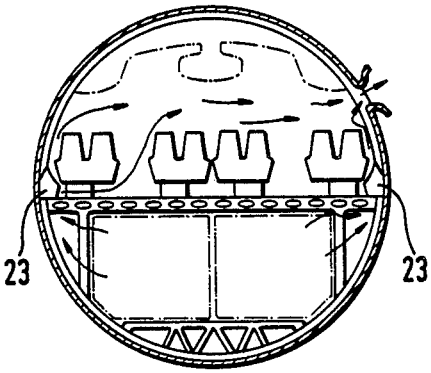

In the case of a decompression in the opposite direction, one usually talks of a blow-out decompression. Here, then, decompression acts in the direction of arrow 22. In such a situation the fracture points in and along the wider part of the T-shaped spring fracture, which means that only the panel 10 and not the frame 11 is forced out of the opening 12. The blow-out decompression situation is shown in FIG. 5b.

Both illustrations, 5a and 5b, show a section through the fuselage of a passenger compartment with the cargo space underneath the passenger compartment. In such an aircraft, further safety equipments are included which may be of the kind shown in German Patent 30,11,109, which will likewise respond to explosive decompression.

Figure 3B:
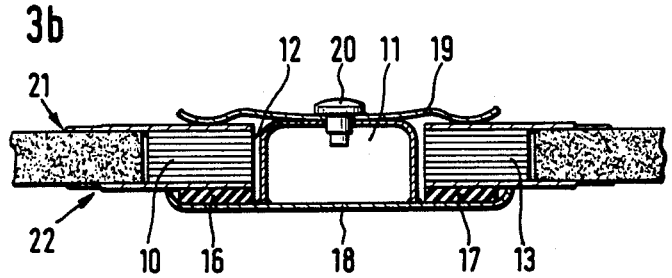
FIG. 3b is a section, as indicated by 3b—3b in FIG. 3b, also being drawn to an enlarged scale, quite comparable in that regard with FIG. 1b.

In the example shown in FIG. 1, is just one possible way to provide a sealing in accordance with the invention. Another solution is shown in FIG. 3. In this case, the legs of a U-shaped frame are somewhat longer, namely by a value that is equivalent to the thickness of the sealing elements which are not placed in any recesses or grooves. Moreover, these legs are angled in the edge zone of the flange 18 in order to better provide for a sealing effect.

The springs for this example are of the type shown with a 49 in FIG. 4a and 4b. They are basically similar to the ones identified by reference numeral 19 in FIGS. 2a and 2b, but they are wider as compared with the earlier situation. Here, then, one needs not three but four blind rivets for fastening. Otherwise, of course, the situation is the same as described in FIG. 1 with, however, a somewhat differently defined differential area owing to the wider bars of the springs 19.

In this example, as well as in the example shown on FIG. 1, flange 18 can be formed through bending the leg of a U-shaped cross-section corresponding to the frame 11. The invention is, thus, not limited to the embodiments specifically described and depicted above, but all changes and modifications thereof, not constituting departures from the spirit and scope of the invention are intended to be included.

We claim:

1. Decompression structure in a partition or the like, separating a passenger compartment from a freight or cargo compartment in an aircraft, there being a particular opening in the partition, comprising:

a decompression panel;

a frame of U-shaped cross section and, as a whole, circumscribing the decompression panel and having an outer contour to be inserted into said opening, end portions of legs of the U-shape of said frame being fastened to a flange;

sealing means for that flange to obtain sealing as against the decompression panel as well as against the partitions adjacent said opening; and the bottom side of the U-shape of said frame being provided with and connected to a plurality of holding springs engaging the partition as well as the decompression panel, each of the springs being provided with predetermined fracture points.

2. Decompression panel structure as in claim 1, there being a first groove in the partition circumscribing that opening, there being a second groove in the panel, the grooves having widths and depths corresponding to a particular sealing of the flange.

3. Decompression panel as in claim 1, said flange being angled off for holding of the seals.

4. Decompression panel as in claim 1, said holding springs being of flat, T-shaped configuration, the wider part abutting the decompression panel, and the narrower part, the partitioning.

5. Decompression structure in a partition or the like, separating a passenger compartment from a freight or cargo compartment in an aircraft, there being a particular opening in the partition, comprising:
- a decompression panel;
- a frame circumscribing the decompression panel and having an outer contour to be inserted into said opening, one side of said frame being provided with fastened a flange;
- sealing means for that flange to obtain sealing as against the decompression panel as well as against the partitions adjacent said opening; and
- the other side of said frame being provided with a plurality of holding springs engaging the partition as well as the decompression panel, each of the springs being provided with predetermined fracture points, said holding springs being of flat, T-shaped configuration, the wider part abutting the decompression panel, and the narrower part, the partitioning.

* * * * *